US010449554B2

(12) United States Patent
Henriquez Prevoo et al.

(10) Patent No.: US 10,449,554 B2
(45) Date of Patent: Oct. 22, 2019

(54) CONCENTRIC ELECTROSTATIC FILTER

(71) Applicants: Christian Paul Henriquez Prevoo, Lima (PE); Michael Paul Henriquez Prevoo, Lima (PE)

(72) Inventors: Christian Paul Henriquez Prevoo, Lima (PE); Michael Paul Henriquez Prevoo, Lima (PE)

( * ) Notice: Subject to any disclaimer, the term of this patent is extended or adjusted under 35 U.S.C. 154(b) by 96 days.

(21) Appl. No.: 15/552,312

(22) PCT Filed: Feb. 29, 2016

(86) PCT No.: PCT/PE2016/000002
§ 371 (c)(1),
(2) Date: Aug. 21, 2017

(87) PCT Pub. No.: WO2016/140583
PCT Pub. Date: Sep. 9, 2016

(65) Prior Publication Data

US 2018/0029043 A1 Feb. 1, 2018

(30) Foreign Application Priority Data

Mar. 4, 2015 (PE) ........................ 000294-2015/DIN

(51) Int. Cl.
*B01D 53/02* (2006.01)
*B03C 3/15* (2006.01)
(Continued)

(52) U.S. Cl.
CPC .................. *B03C 3/15* (2013.01); *B03C 3/01* (2013.01); *B03C 3/016* (2013.01); *B03C 3/06* (2013.01);
(Continued)

(58) Field of Classification Search
CPC ............. A47C 16/00; A61F 2005/0155; A61F 2005/0188; A61F 5/0118; A61F 5/013;
(Continued)

(56) References Cited

U.S. PATENT DOCUMENTS 2,273,194 A * 2/1942 Hedberg .................. B03C 3/16
55/DIG. 38
3,315,444 A * 4/1967 De Seversky ............ B03C 3/14
261/79.2
(Continued)

*Primary Examiner* — Christopher P Jones
(74) *Attorney, Agent, or Firm* — Patshegen IP LLC; Moshe Pinchas

(57) ABSTRACT

An electrostatic filter, for filtering solid and liquid particles in gases composed of a case (3); concentric collectors (15), concentric diffusers (10); electrodes (2); insulated supports (7), distributor disc (8), thermal insulator (17), electrical resistors (4), main collector (9), filter cap (1); the concentric diffusers (10) host along their internal and external wall the electrodes (2); the insulated supports connect the filter cap (1) to the distributor disc (8) which in turn supports the concentric diffusers (10); the electrical resistors (4) are located around the case (3) as clamps and are covered by the thermal insulator (17); so that the gas flows through the filter from the filter inlet (14) located tangentially at the external face of the case (3), towards the insulated outlet (5) located in the central part between the distributor disc (8) and the filter cap (1), thus optimizing the space and surface of the constituent materials and a very high filtration efficiency of liquid and solid micron particles contained in gases at any temperature up to 900° C.

1 Claim, 4 Drawing Sheets

(51) Int. Cl.

| | |
|---|---|
| ***B03C 3/41*** | (2006.01) |
| ***B03C 3/49*** | (2006.01) |
| ***B03C 3/82*** | (2006.01) |
| ***B03C 3/06*** | (2006.01) |
| ***B03C 3/78*** | (2006.01) |
| ***B03C 3/01*** | (2006.01) |
| ***B03C 3/016*** | (2006.01) |
| ***B03C 3/36*** | (2006.01) |

(52) U.S. Cl.
CPC ................ *B03C 3/366* (2013.01); *B03C 3/41* (2013.01); *B03C 3/49* (2013.01); *B03C 3/78* (2013.01); *B03C 3/82* (2013.01); *B03C 2201/28* (2013.01)

(58) Field of Classification Search
CPC ........ A61H 2201/5058; A61H 2205/06; A61H 23/00
See application file for complete search history.

(56) References Cited

U.S. PATENT DOCUMENTS

| | | | | |
|---|---|---|---|---|
| 3,438,180 | A * | 4/1969 | Klouda | B03C 3/14 439/894 |
| 3,915,676 | A * | 10/1975 | Reed | B03C 3/155 55/304 |
| 6,241,810 | B1 * | 6/2001 | Wikstrom | B03C 3/12 96/69 |
| 10,150,120 | B2 * | 12/2018 | Seeley | B01D 53/1456 |
| 2002/0134238 | A1 * | 9/2002 | Conrad | A47L 9/122 95/79 |
| 2010/0307332 | A1 * | 12/2010 | Yuen | A61L 9/20 95/26 |
| 2012/0222550 | A1 * | 9/2012 | Ellis | B01D 53/1456 95/65 |
| 2013/0133518 | A1 * | 5/2013 | Allan | B03C 3/025 96/52 |

* cited by examiner

CONCENTRIC ELECTROSTATIC FILTER

1 TECHNICAL FIELD

Electrostatic filter with electrical resistors and with a collector of solid or liquid particles, which changes according to the application, which removes the solid and/or liquid particles from a gaseous medium, and which is applied in the industrial sector, mainly in the industry of hydrocarbons at the stages of production, process, transport and distribution of gases.

2 STATE OF THE TECHNIQUE

Nowadays, the electrostatic filter exists, which is used in industrial applications for the filtering of gases in temperatures ranging from 15° C. to 200° C., consisting of a certain number of separated circular tubes or shared-walled polygonal tubes; in the center of which, either the circular tube or the polygonal one, there is an electrode subjected to a certain electric voltage normally between 30 kV and 50 kV, which causes a potential difference that decreases along the radius and becomes zero on the inner wall of the tube called collector, since it is electrically grounded. The number of tubes depends on the amount of gas, thus they become numerous (from 50 to 100 tubes normally) and their diameter is about 170 millimeters. The high voltage at the electrode creates a corona effect on gas, ionizing it due to the strong impact of the electrons against the gaseous molecules, an effect that occurs in neighboring regions along the electrode. In a little more distant regions, the little less accelerated electrons adhere to large surfaces, microscopically speaking, as they are particles of solid or liquid nature, thus charging them negatively. These charged particles are driven radially by the field towards the collector. The particles or dirt close to the inner wall of the tube descend because the drag force in this zone is minimal due to the laminar flow of the gas. The collection is obtained in the lower part of the tube where there is a chamber from which the tubes are born and that serves for the distribution of the gas incoming to all the tubes that are set parallelly. The gas is collected through an upper chamber which all the tubes share, it then passes on to the subsequent process.

2.1 Problems With the Current State of the Technique

The fact of having several tubes in parallel and that the tubes in parallel do not offer a considerable loss of pressure causes the gas to take preferential paths, thus resulting in higher flows in some tubes where the residence time of the gas will be much lower than the calculated. Thus the filtering efficiency, which is understood as the amount of particles of certain size filtered contrasted with the total amount of that size, is affected tremendously.

As the gas flow is smaller than that of the design, the above-mentioned effect will be boosted, increasing so the likelihood that the entire gas flow passes only through one tube, wherewith efficiency will be much lower than expected; therefore the outgoing gas will carry the majority of unwanted liquid or solid particles.

As collecting surface mainly made of stainless steel, only the internal walls of the tubes are used, thus requiring a large amount of steel, making the electrostatic filter one of the most expensive filtering technologies available in the industry.

Due to the arrangement and geometry of the electrode, just one side is tied, and usually on the higher side. Being the electrode larger than one meter and of fine diameter; to maintain the verticality becomes impossible and wherever the electrode is tilted, the emission of electrons is specially favored on the side closer to the wall of the collector tube. Considering that the amount of electrons emitted by the high voltage module is constant and limited at a certain maximum amount for which it was designed; due to the mentioned lack of verticality, a non-uniform distribution of a limited quantity of electrons occurs, being therefore the emitted quantity of electrons not the same neither along the electrode nor in all the filter tubes, fact that reduces tremendously the efficiency of the filter. Monitoring of the verticality of the electrode is done mostly visually from above (which might cause a perspective error). Due to the long time this task demands, it is costly and might cause long production shut downs.

For gases with a dew point temperature greater than the environment temperature, there will be condensation along the inner wall of tubes, due to their large heat exchange surface. Producing unwanted condensate that could chemically stick or adhere itself to the walls; thus obstructing the tube gradually in certain parts, which would cause electrical grounded zones or even points closer to the electrode, incurring the problem mentioned in the previous item.

For gases produced from high temperature reactors ranging from 300° C. to 900° C., where soot particular reactions carries on, it is normally desired to filter the soot or micron dust leaving the reactor, it is impossible to use the current configuration for the effect mentioned in the previous item. Additionally, the soot or micron dust would be added to the condensate in the walls forming a paste that would not descend, blocking the filter almost immediately.

In order to filter gases at high temperature, the ceramic filter is the best option nowadays but has a larger pressure drop (high energy consumption) and frequent clogging, increasing so, maintenance period and cost.

3 BRIEF DESCRIPTION OF THE DRAWINGS

4 DESCRIPTION OF THE INVENTION

Figure 1:
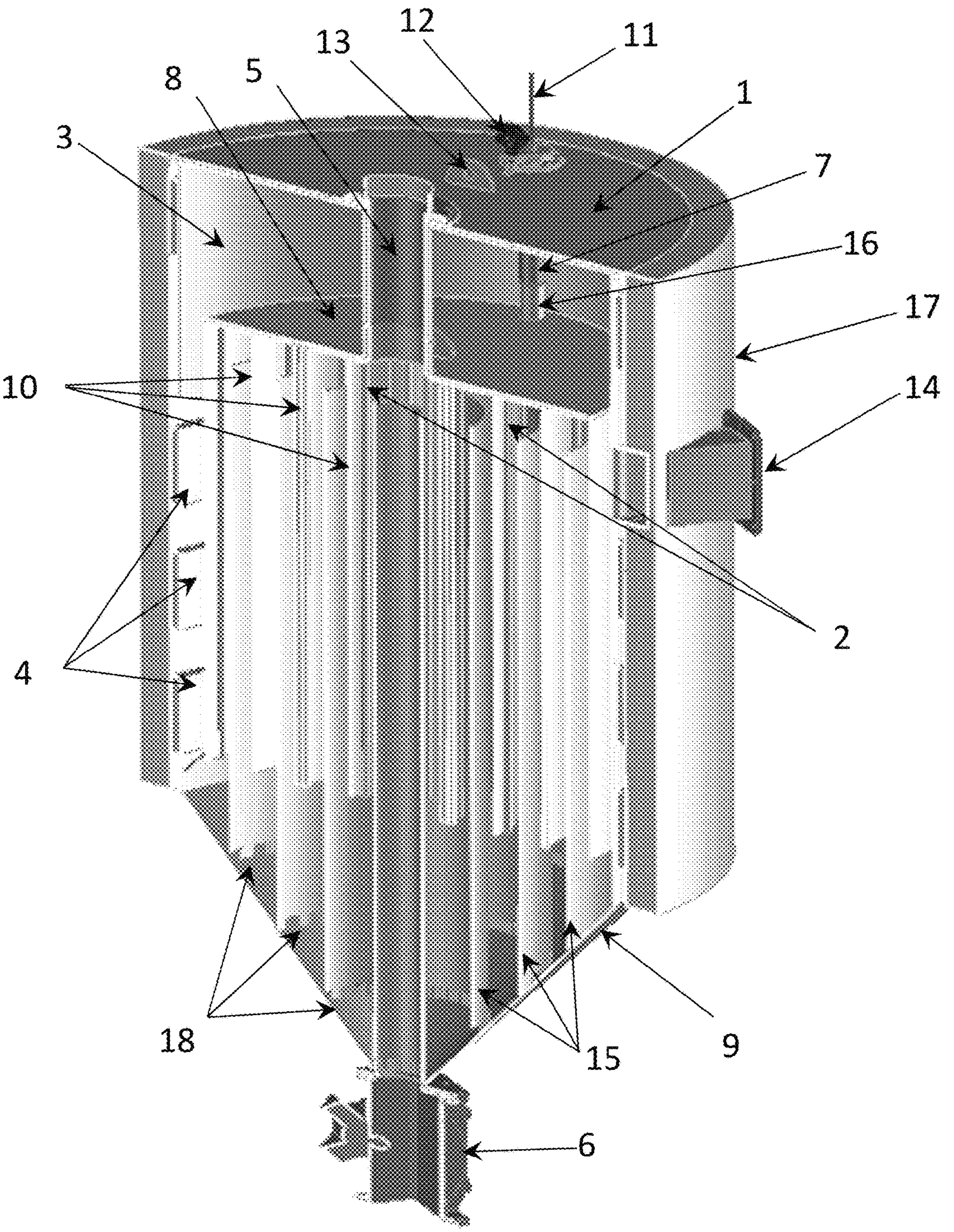
FIG. 1 is a cross sectional view of the filter
Figure 2:
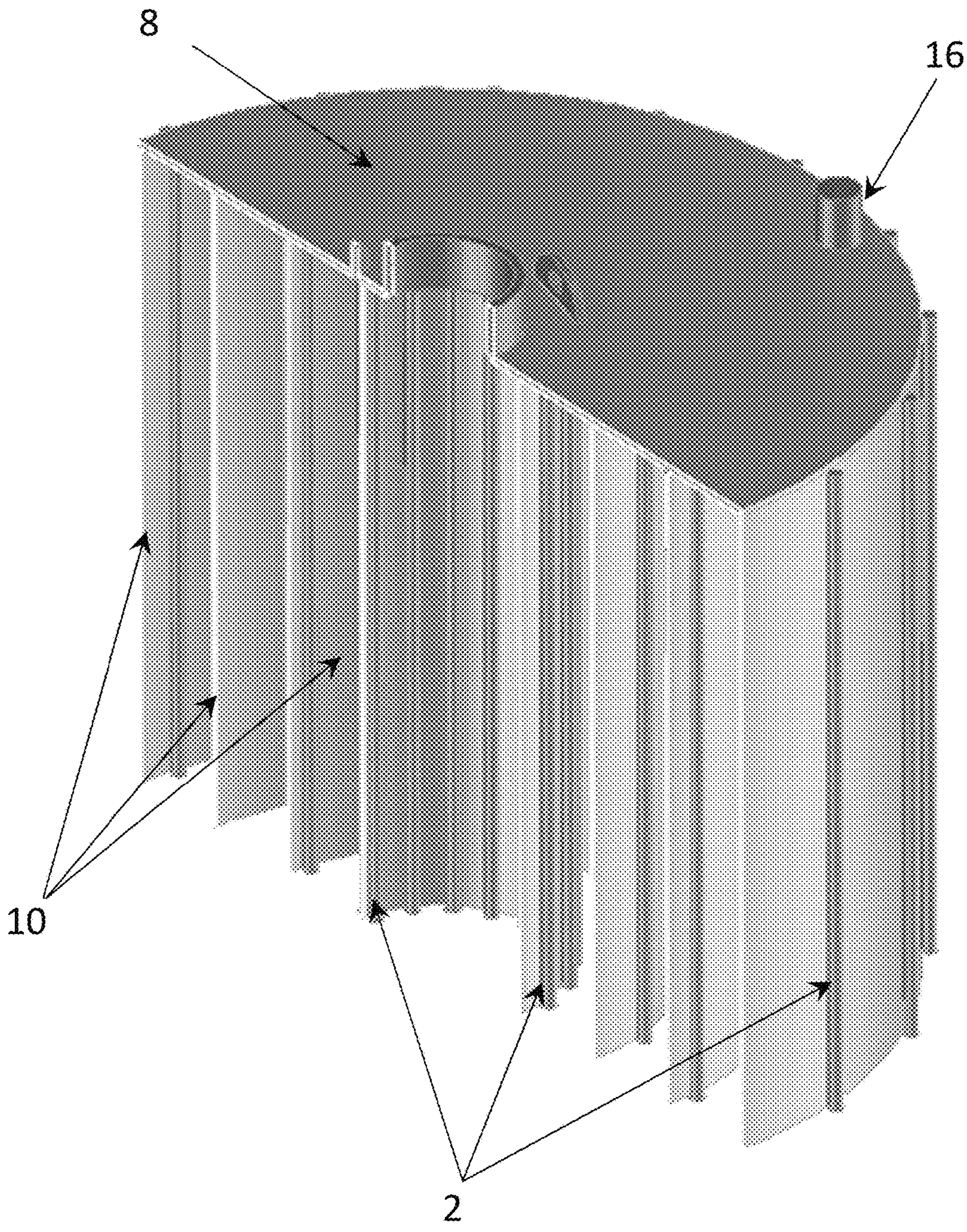
FIG. 2 is cross sectional view of the concentric diffusers
Figure 3:
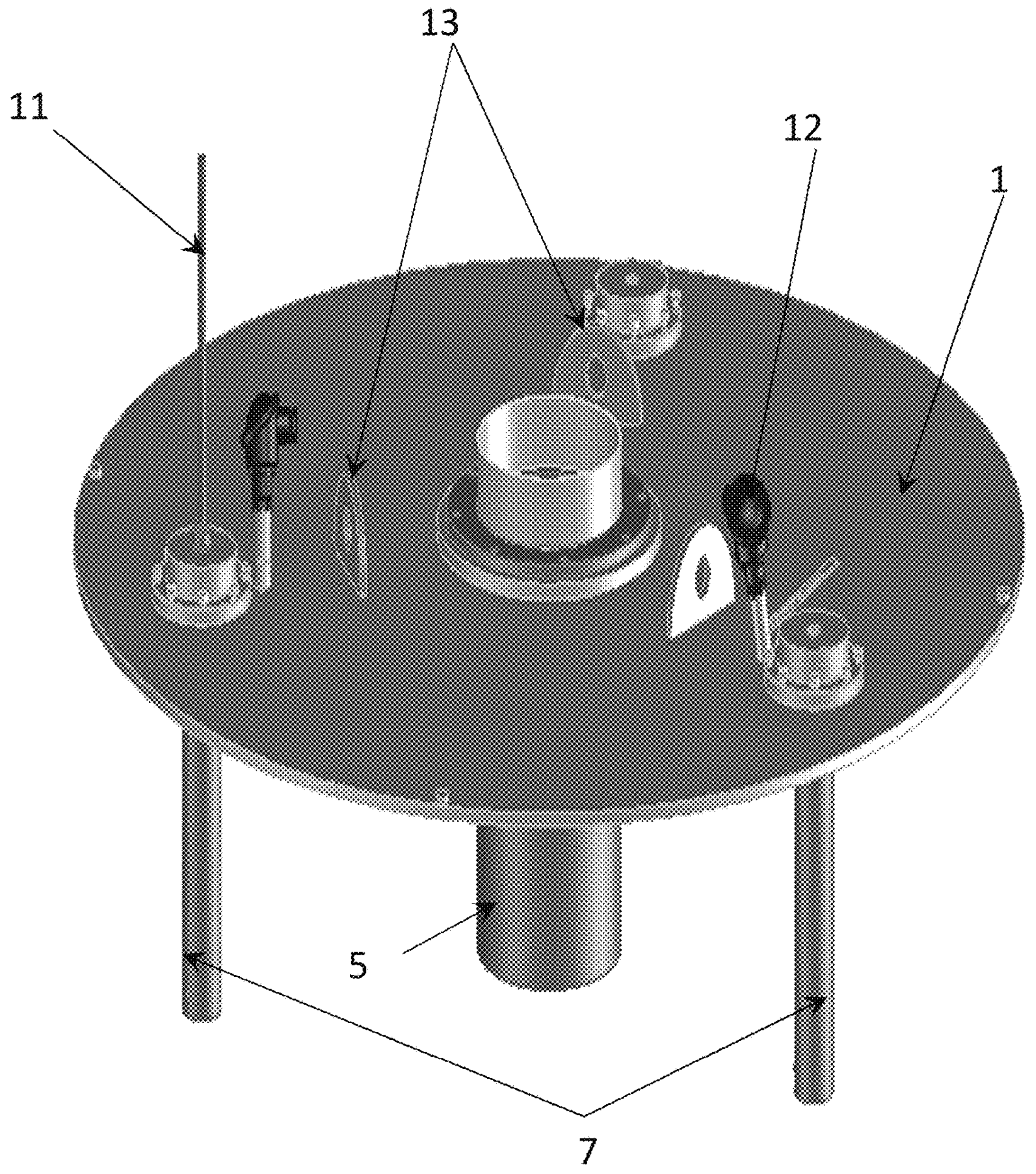
FIG. 3 is side view of the filter cap
Figure 4:
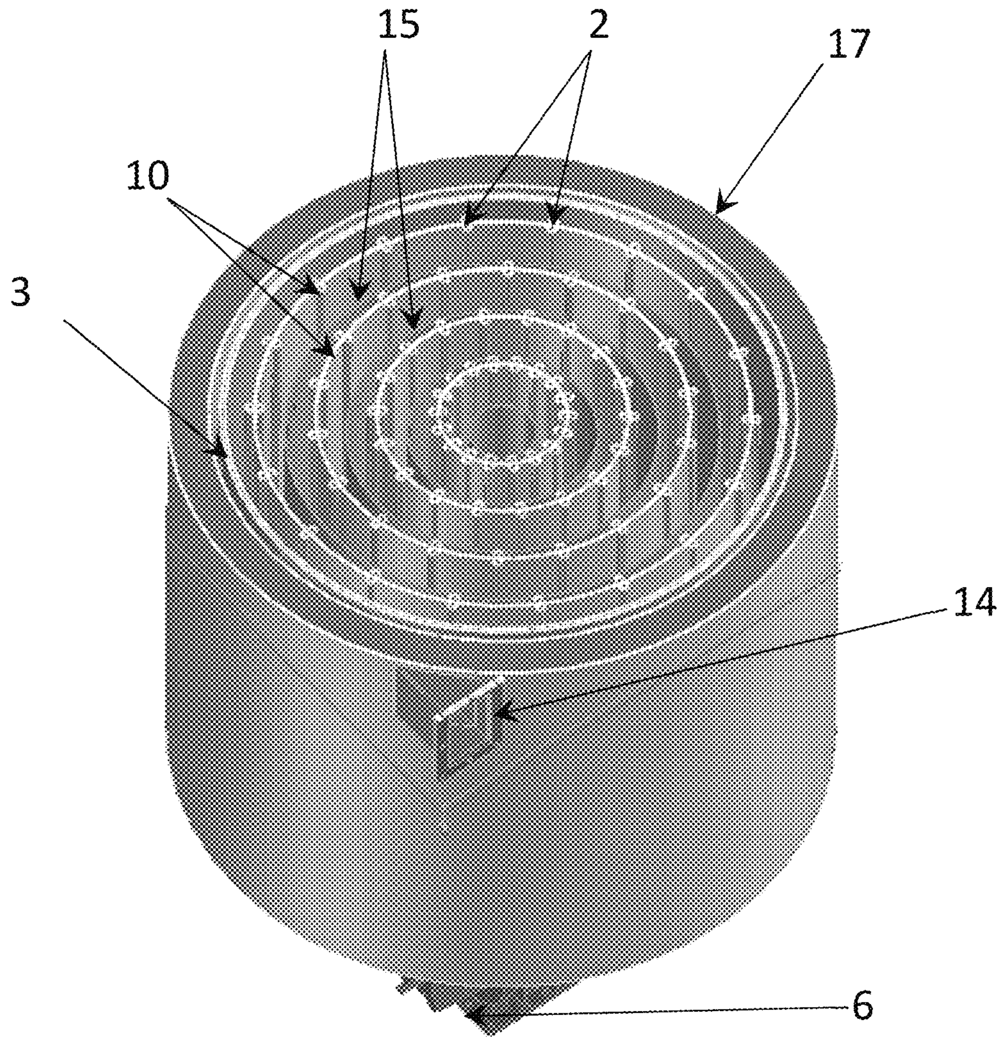
FIG. 4 is a horizontal cut, plant view of the filter

The invention is an electrostatic filter which allows the filtration of solid and liquid particles in gases. It consists of a case (3), preferably cylindrical, with a filter inlet (14) through which the gas enters tangentially to the inner wall and subsequently leaves the filter through the insulated outlet (5) attached to the top of the distributor disc (8) and ends in the filter cap (1). The insulated outlet (5) is located in the central part of the filter cap (1) which is electrically insulated from the distributor disc despite contact. The bottom side of the distributor disc (8) is attached to several concentric diffusers (10), preferably cylindrical, which host along their inner and outer walls the electrodes (2), which are several rods of very thin diameter that contact at top the distributor disc (8) and are spaced equidistantly from one another. The distributor disc (8) is supported by the filter cap (1) through junction elements or pins between the insulated supports (7) and the disc connectors (16) through which the electric voltage is communicated to the distributor disc (8) thanks to an external insulated high-voltage electric conductor (11) inserted through the internal hole of the insulated supports (7) that contacts the head of the disc connectors (16).

The case (3) is attached to the main collector (9) preferably conical with small slots (18) for liquid particle filtering applications, and with large and widely open slots for solid particle filtering applications. The main collector (9) is at zero or ground voltage and supports internally the concentric collectors (15), preferably cylindrical, equally spaced between them and the concentric diffusers (10). The space between the concentric collectors (15) and the main collector (9) at the startup, starts filled with solid or liquid particles up to a certain level which is slightly higher than the upper edge of the slots of the concentric collectors (15) and level remains constant thanks to the discharge star valve (6) referenced to a certain level by means of a level sensor not shown.

The case (3), is attached to the filter cap (1) through anchoring bolts, and externally contacts the internal face of electrical resistors (4) that surround it and heat it when needed, to keep filter temperature, measured by the thermocouples (12), as desired. The filter is covered by a thermal insulator (17) to avoid heat exchange with the environment.

Due to the filter configuration, explained in the previous paragraphs, it is achieved that the gas enters tangentially and then descends producing a cyclonic effect until a certain elevation, obtaining later a ring shaped profile of descent between the inner wall of the case (3) and the outer wall of the first concentric diffuser (10) where the charge and the expulsion of the particles to the concentric collectors happens. The gas then rises through the concentric ring between the inner wall of the first of the concentric diffusers (10) and the outer wall of the first of the concentric collectors (15) and the same happens for the next of the concentric diffusers and concentric collectors, following an upward and downward trajectory being subjected to the effect of electrostatic precipitation until reaching the insulated outlet (5). The solid and liquid particles precipitate down to the main collector (9).

4.1 Solution to the Current Problem

After entering, the gas descends for a sufficient time as to uniform and occupy all the space between the concentric diffusers (10) and the concentric collectors (15), thus ensuring that the gas flow passes through the entire filtering field; not reducing efficiency.

In the case that the flow is lower than that of the design, the gas will have a longer residence time, being this more advantageous, because the charged particle will be more likely to reach the concentric collectors (15) before leaving the filter.

As collecting surface, the inner surface of the case (3) is used, plus the inner and outer surfaces of the concentric collectors (15), thus optimizing the material used and the volume of the filter too.

The verticality of the electrodes (2) is ensured by the verticality of the concentric diffusers (10), thus achieving a uniform controlled electrons rain along the electrodes (2) and thereby along the single trajectory of the gas.

The temperature of the filter is controlled by the electrical resistors (4) at a desired value higher than the dew point of the gas avoiding therefore unwanted condensable elements; incrustations and adhesions.

For gases produced by high temperature reactors; the filter can be brought to a temperature higher than gas dew point, thus obtaining a dry filtration of the micron particles produced contained in the gas stream as soot for instance.

The configuration of the filter allows easily the lifting of the internal parts, right after the filter cap (1) has been unmounted, making a quick and non-contact maintenance. It only requires pressurized water on the concentric diffusers (10) and collectors (15).

Maintenance is low since configuration avoids the accumulation of solid or liquid due to their evacuation by the star valve (6)

5 DESCRIPTION OF ILLUSTRATIONS

5.1 Detail 1: Filter Cross Section

1. Filter Cap
2. Electrodes
3. Case
4. Electrical Resistors
5. Insulated Outlet
6. Star Valve
7. Insulated Supports
8. Distributor Disc
9. Main Collector
10. Concentric Diffusers
11. High voltage electric conductor
12. Thermocouple
13. Lifting lugs
14. Filter Inlet
15. Concentric Collectors
16. Disc Connectors
17. Thermal Insulator

5.2 Detail 2: Concentric Diffusers Cross Section

2. Electrodes
8. Distributor Disc
10. Concentric Diffusers
16. Disc Connectors

5.3 Detail 3: Filter Cap Details

1. Filter Cap
5. Insulated Outlet
7. Insulated Supports
11. High voltage electric conductor
12. Thermocouple
13. Lifting lugs

5.4 Detail 4: Horizontal Cut, Plant View

2. Electrodes
3. Case
6. Star valve
10. Concentric Diffusers
15. Concentric Collectors
17. Thermal insulator

The invention claimed is:

1. A concentric electrostatic filter for filtering solid and liquid particles in gases comprising:

a case (3), which has an entrance or filter inlet (14) through which a gas is introduced tangentially;

a distributor disc (8) that supports concentric diffusers (10), which house, along their walls, electrodes (2) which are in contact at their upper end with the distributor disc, spaced equidistantly from one another; and the distributor disc (8) is supported by the filter cap (1) through junction elements or pins between insulated supports (7) and disc connectors (16) through which high electric voltage is communicated to the distributor disc (8) by an insulated high-voltage electric conductor (11) inserted through an internal hole of the insulated supports (7) that contacts a head of the disc connectors (16);

an insulated outlet (5) which extends from the top of the distributor disc (8) to a filter cap (1), said insulated outlet is configured to allow said gas to leave the electrostatic filter;

a main collector (9) that is attached to a bottom of the case (3), which has slots (18) for filtering particles;

concentric collectors (15) supported by the main collector (9), and electrically grounded, said concentric collectors are equally spaced from one another and from at least one of the concentric diffusers (10);

a pressure insulating valve (6) located below the main collector (9) and the slots (18), which collects impurities;

thermocouples (12) located in the filter cap (1);

a thermal insulator (17) that covers the electrostatic filter, to avoid heat exchange with the environment; and electrical resistors (4) located around the case as clamps and covered by the thermal insulator (17).

* * * * *